United States Patent [19]

Toppins et al.

[11] 4,268,053

[45] May 19, 1981

[54] WHEEL FENDER ASSEMBLY

[75] Inventors: Charles R. Toppins, Knoxville; Cecil L. Williams, Concord; Otto H. Korth, Maryville, all of Tenn.

[73] Assignee: Dempster Systems Inc., Knoxville, Tenn.

[21] Appl. No.: 69,685

[22] Filed: Aug. 27, 1979

[51] Int. Cl.³ .............................................. B62D 25/16
[52] U.S. Cl. ............................... 280/154; 280/154.5 R
[58] Field of Search ............ 280/152 R, 152 B, 152.3, 280/153 R, 153.5, 154, 154.5, 154.5 A, 159, 160

[56] References Cited

U.S. PATENT DOCUMENTS

| | | | |
|---|---|---|---|
| 2,538,839 | 1/1951 | Limberg | 280/152 R |
| 2,679,403 | 5/1954 | Howard et al. | 280/154.5 R |
| 2,914,341 | 11/1959 | Martt | 280/152 R |
| 2,940,773 | 6/1960 | Eaves | 280/154.5 R |
| 3,158,386 | 11/1964 | Tillinghast et al. | 280/154.5 R |
| 3,506,282 | 4/1970 | Miyanaga | 280/152 R |
| 3,711,119 | 1/1973 | Hollingsworth | 280/154.5 R |
| 3,876,229 | 4/1975 | Kohn et al. | 280/152 R |
| 3,922,003 | 11/1975 | Lea | 280/154.5 R |

FOREIGN PATENT DOCUMENTS

| | | | |
|---|---|---|---|
| 718230 | 1/1932 | France | 280/154.5 R |
| 1218911 | 1/1971 | United Kingdom | 280/152 R |
| 463574 | 10/1975 | U.S.S.R. | 280/152 R |

Primary Examiner—David M. Mitchell
Attorney, Agent, or Firm—Jacox & Meckstroth

[57] ABSTRACT

A wheel fender assembly for vehicle wheels connected to a vehicle frame and including a horizontally extending intermediate upper section and two angularly and downwardly extending lateral portions. The assembly comprises a single support connection between the vehicle body and intermediate section of the fender and single point support connections to the lateral portions arranged to allow pivoting movement of the lateral portions.

2 Claims, 6 Drawing Figures

WHEEL FENDER ASSEMBLY

BACKGROUND OF THE INVENTION

1. Field of the Invention

This invention relates to a wheel fender for the wheels of trucks or semi-trailers and more particularly to the mounting mechanism for holding the wheel fender on a frame of the vehicle.

2. Description of the Prior Art

Vehicles such as trucks or semi-trailers of the type used to carry loaded containers mounted on the frame of the vehicle, have wheel fenders or casings which are rigidly secured to the vehicle frame. Typically, the wheel fenders are subject to twisting stresses when the truck is used on rough irregular surfaces such as landfill operations. Under adverse operating conditions, the frame of the vehicle is subjected to excess dynamic loads causing twisting and deformation of the frame. The wheel fenders, secured to the vehicle frame, are also exposed to distortion and twisting. During relative movement between the vehicle frame and the wheel fender, damage to the conventional fender and rigid mounting would result.

SUMMARY OF THE INVENTION

The primary object of the present invention is to improve wheel fender assemblies used on vehicles subjected to twisting forces in the frame of the vehicle.

Another object of this invention is to provide a vehicle wheel fender having improved supporting means for attaching the wheel fender to a vehicle frame.

Still another object of this invention is to provide a mounting mechanism which allows a vehicle wheel fender to be secured to the vehicle frame and still be able to pivot independently from the frame.

These and other objects are attained by supporting means consisting of a single point rigid connection between the fender and the vehicle and pivotable connections means supporting the ends of the fender. This construction permits the vehicle wheel fender lateral portion to twist or float with respect to the vehicle frame thus preventing or minimizing stresses caused by the twisting of the vehicle frame.

DETAILED DESCRIPTION OF THE PREFERRED EMBODIMENTS

Figure 1:
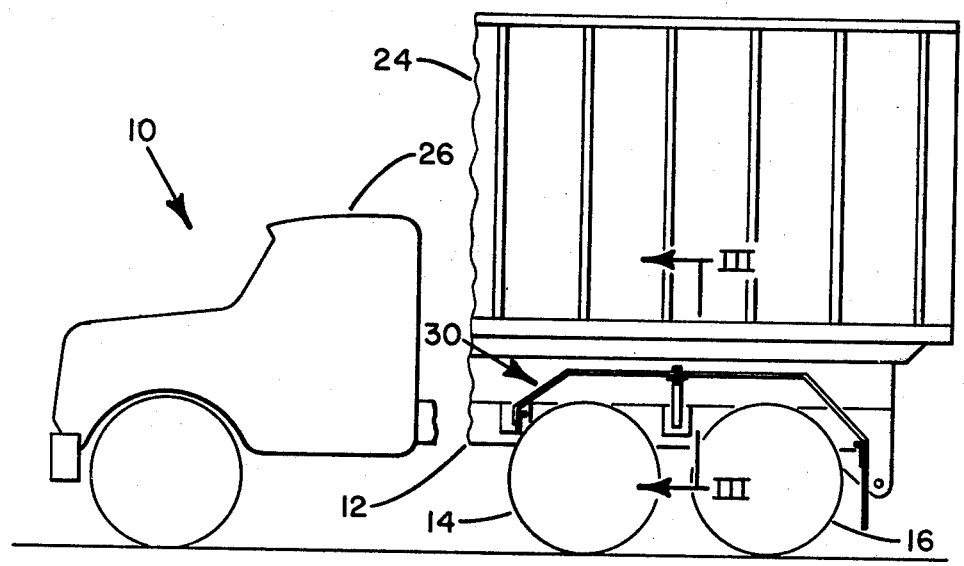
FIG. 1 is a partial side elevation view of a vehicle having wheel fenders in accordance with the preferred embodiment of the present invention.

FIG. 1 illustrates a vehicle generally designated 10 having a chasis or vehicle frame 12, a cab 26 and a pair of dual tandem wheels disposed at each side of the frame 12 and shown at one of its sides as 14 and 16. The vehicle frame shown in FIG. 2 includes two longitudinally extending laterally spaced rigid members 18 and 20 which are constructed of channel iron, or any other suitable structural member. The members 18 and 20 are interconnected to provide a rigid frame structure. The vehicle frame is connected to the axles which journal the dual tandem wheels 14 and 16 in the normal manner. The vehicle frame supports a body or removable container generally designated 24.

Figure 2:
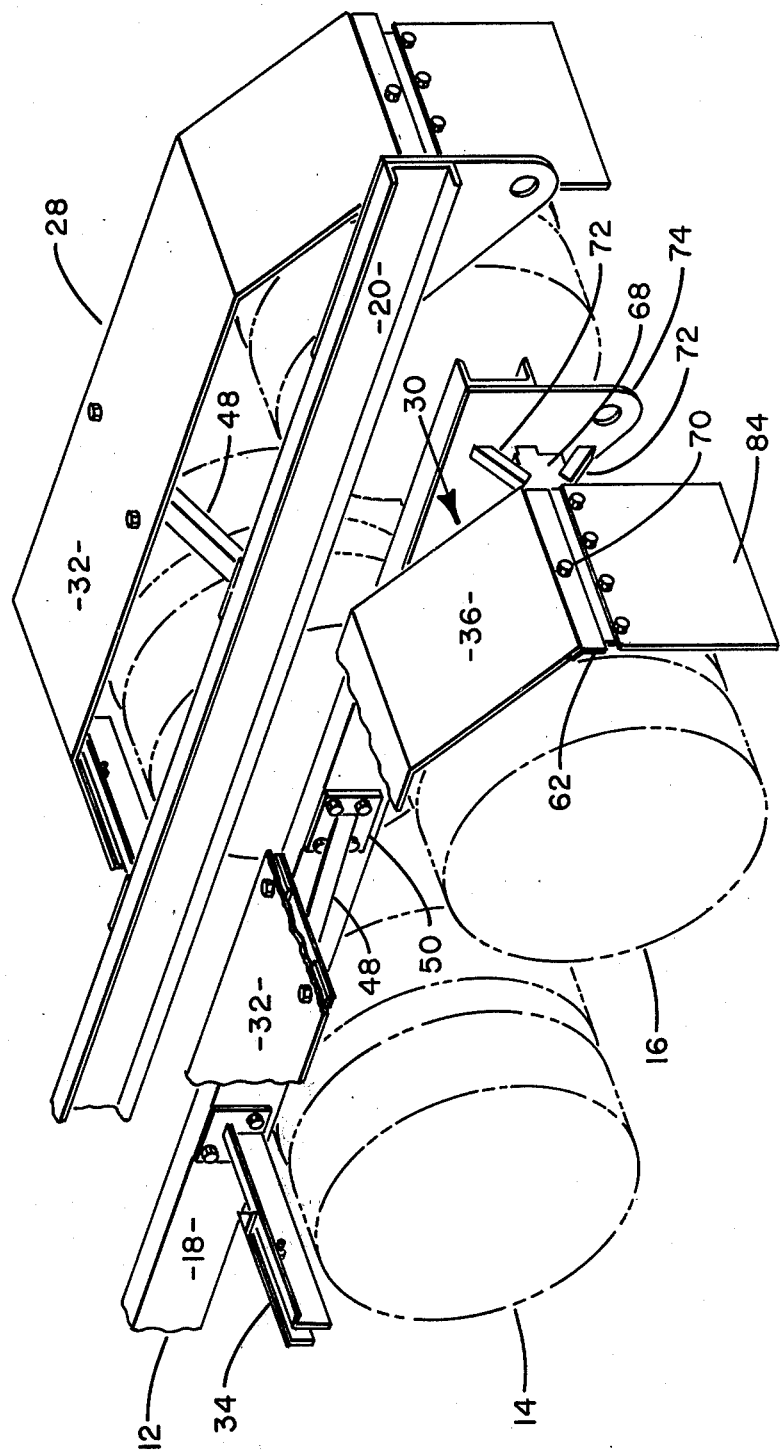
FIG. 2 is a partial perspective view of a vehicle frame with portions of the wheel fenders broken away to show mounting brackets.

As can be seen from FIGS. 1 and 2, wheel fenders 28 and 30 are mounted above the wheels and secured to vehicle frame 12 by brace 48. The FIGS. 1-4 illustrate one embodiment of the wheel fender structure. The wheel fenders 28 and 30 are substantially identical in construction and arrangement. Referring to the wheel fender 30, an upper horizontally extended intermediate essentially flat plate 32 has two angularly bent lateral portions 34 and 36 extending downward from the ends thereof. The wheel fender is typically formed from suitable sheet material and the lateral portions 34 and 36 may be integral with the intermediate section 32 or may be separate plates welded thereto. As shown herein angle brackets 38 are secured to a bottom side of the wheel fender at the corner connections between the intermediate portion and each lateral portion, for example by a spot-welding to give substantial rigidity to the wheel fender.

Figure 3:
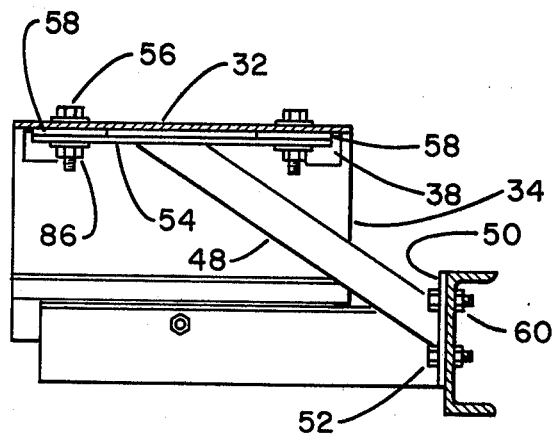
FIG. 3 is a sectional view taken along line 3—3 of FIG. 1, showing a bracket for securing the upper central portion of the wheel fender to the vehicle frame.

Referring to FIGS. 1 through 4, it can be seen that the upper intermediate portion 32 is secured to the vehicle frame 12 by a brace 48 which may be any suitable structural means as for example a pipe tubing or bar stock. Brace 48 is inclined transversally to connect the frame 12 with the underside of the fender. The lower end of the brace 48 is secured to a mounting plate 50 which in turn is fastened to the vehicle frame by any conventional fastening means such as the four bolts 52 and nuts 60 as seen in FIG. 3. The upper end of the brace 48 is rigidly connected to a mounting plate 54 which is secured to the fender upper portion 32 by two bolts 56 and nuts 86. Each of the bolt connections 56 includes a rubber grommet 58 to take up vibrations as the vehicle frame vibrates.

Figure 4:
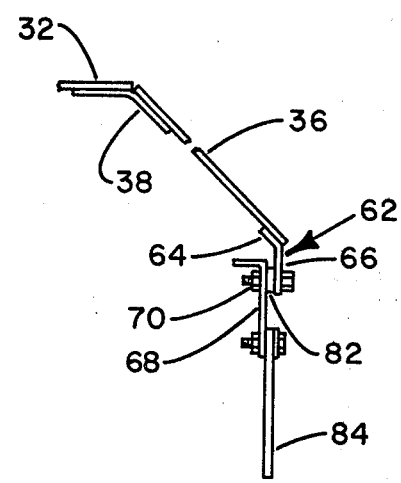
FIG. 4 is a partial enlarged elevational view of the rear portion of the wheel fender assembly shown in FIG. 1.

Referring to FIGS. 2 and 4, it can be seen that each of the lateral portions 34 and 36 of the wheel fenders (only rear lateral portion 36 is shown) has a mounting support 62 extending downwardly from the end thereof. The mounting support 62 has one leg 64 extending angularly upwardly and secured to the lateral fender portion 36, and the other leg 66 extends vertically downwardly and is secured to a mounting member 68 by bolt connection 70. Mounting member 68 is rigidly connected to the vehicle frame 12 by mounting brackets 72 which in turn are secured to a mounting plate 74. Mounting plate 74 is secured to the vehicle frame by any suitable means. The front portion 34 of the wheel fender has the same connection to a mounting plate connected to the vehicle frame. Referring to FIG. 4, the bolt connection 70 between mounting support 62 and the mounting angle 68 includes a member of flexible material, such as a rubber washer or grommet 82 which provides clearance between the metal parts. The rubber washer 82 permits a pivoting or twisting of the lateral fender portion with respect to the vehicle frame when the vehicle frame is subjected to twisting. A splash guard 84 may be secured to the mounting angle 68.

When the vehicle is in operation in landfills or other irregular terrain the wheels take positions at different levels and cause exceptional twisting of the frame. In some instances the wheels on one side of the vehicle frame move downwardly into a depression while the wheels positioned on the other side of the vehicle frame will be raised with respect to the front wheels of the vehicle. This will cause a twisting of the vehicle frame and consequently a twisting of conventional rigidly secured fenders. Connection of the lateral fender portion to the vehicle frame in one point by bolt connection 70 and the clearance provided by rubber grommet 82 permit the lateral bent portions 34 and 36 of the wheel fender to pivot relative to the vehicle frame and accommodate some of the deflection caused by the vehicle frame twisting. The rubber washer interposed between the mounting angle 68 and mounting support 62 permits relative movement between the frame and the fender and avoids the effect of stresses which can give rise to serious problems such as damage and even eventual wheel fender failure. This action can be visualized by considering the fender action if the connection of the fender to the frame was only a single point. In this case no moment forces could be produced in the fender by twisting the frame. Then to prevent vibrations at the fender, the ends of the fender are coupled in a manner which allows some clearance for twisting but restricts vibrations. The frame may now take a position different than the fender position without forcing the fender to twist also. However as described herein, the single point rigid connection at the center of the fender to the frame and the pivotable connections of the ends or lateral portions allows the frame to twist without distorting or severly twisting the fenders.

Figure 6:
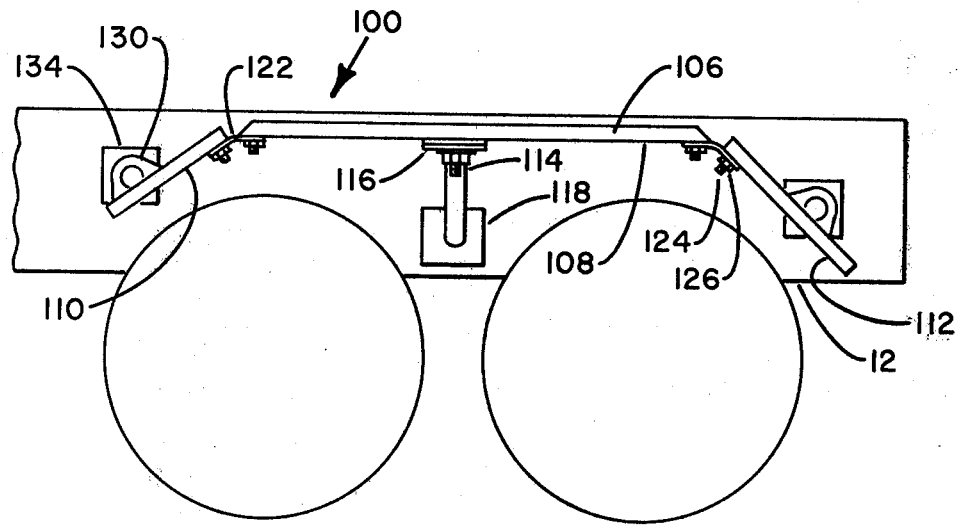
FIG. 6 is a side elevational view of the wheel fender assembly shown in FIG. 5.
Figure 5:
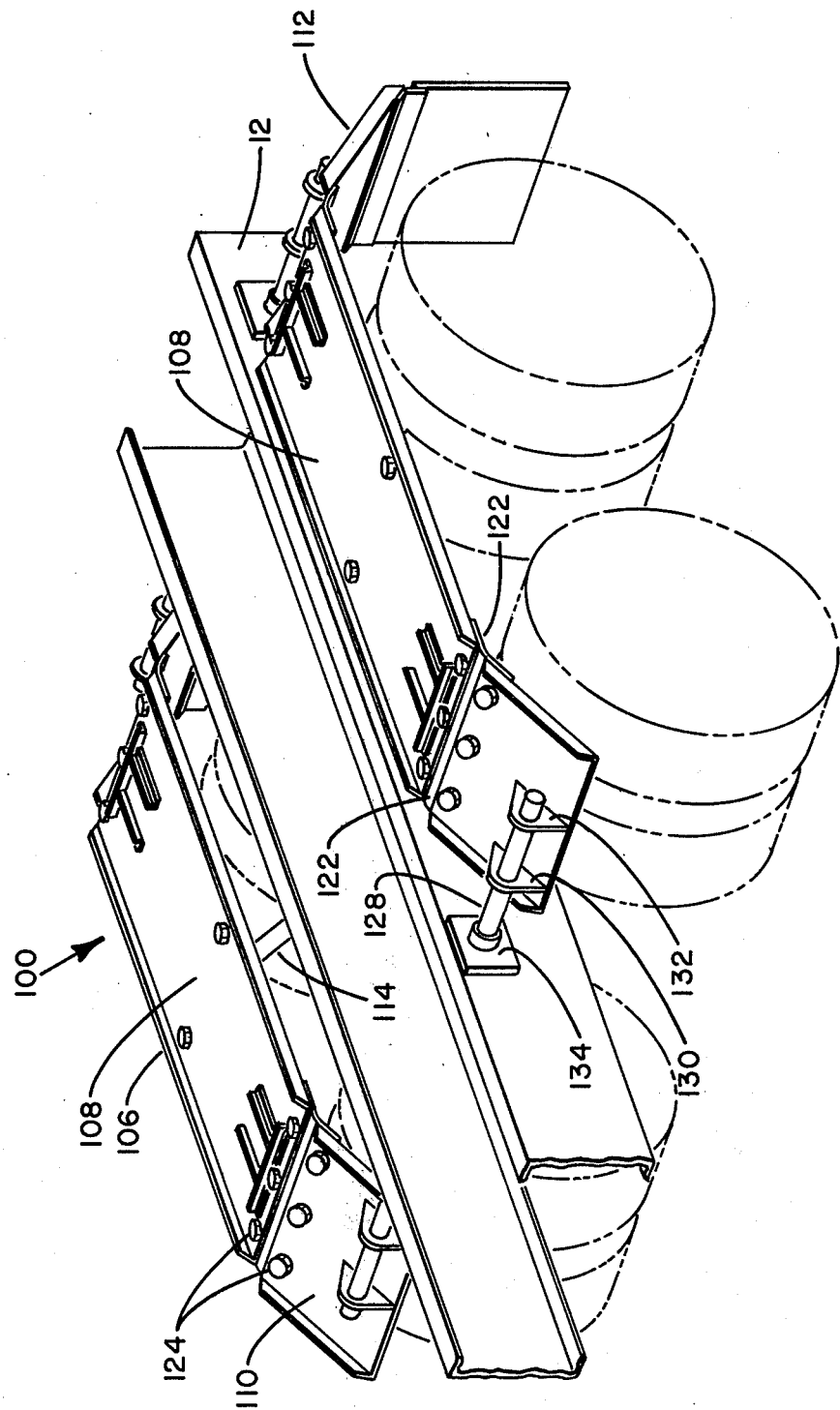
FIG. 5 is a partial perspective view of a second embodiment of the wheel fender mounted on the frame.

FIGS. 5 and 6 illustrate an alternate embodiment of the present invention. As it can be seen in FIG. 6, the wheel fender generally designated by numeral 100 includes three sections, each formed of suitable sheet material and being relatively rigid in structure. The wheel fender 100 contains an intermediate section or portion 108 and two laterally and downwardly extending slant sections 110 and 112. Preferably, each section is formed with integral upwardly projecting flanges 106 on each side of the section giving the structure substantial rigidity. The upper intermediate section 108 is rigidly connected to the vehicle frame 12 by any suitable means, similar to those shown in FIG. 3 for the first embodiment. A brace 114 is fixedly secured by its upper end to a mounting plate 116 welded or bolted to the fender section 108 and by its lower end to a mounting plate 118 welded or bolted to the vehicle frame 12. Each of the lateral fender sections is connected to the intermediate section by a flexible member 122 which is extended through the whole transverse width of the wheel fender. Member 122 is secured to the intermediate section and to the lateral sections of the wheel fender by fastening means, for example by bolts 124 and nuts 126. The outer ends of the lateral sections 110 and 112 are secured to the vehicle frame by means shown in FIG. 5. A rod tubing pipe element 128 or any other suitable member is rigidly connected at one end to a mounting plate 134 secured to the vehicle frame 12 and at its opposite end to mounting brackets 130 and 132 which are attached to lateral sections 110 and 112. The flexible member 122 may be formed from rubber or any other suitable material. The flexible member arranged between the upper section 108 and each of the angular sections 110, 112 permits the lateral sections to twist with respect to the intermediate portion 108 when twisting of the vehicle frame is caused by the position of the vehicle wheels when the truck is travelling on uneven terrain.

While this invention has been illustrated in accordance with preferred embodiments it is recognized that variations and changes may be made therein without departing from the invention as set forth in the claims.

We claim:

1. A fender assembly for mounting on the frame of a wheeled vehicle comprising:
   an intermediate flat rigid portion,
   lateral downwardly sloping portions positioned at each end of the intermediate portion,
   a connector suspended from the vehicle frame to engage the intermediate portion,
   means to secure said connector at one location on the intermediate portion,
   support brackets connected to the frame adjacent to said lateral portions,
   a pivot bolt connecting each lateral portion to a support bracket to allow pivoting movement of said lateral portions relative to the vehicle frame.

2. A fender assembly of the type mounted on the frame of a vehicle to cover the wheels of the vehicle comprising
   a wheel cover mounted over the top of the wheels of the vehicle and including a substantially flat elongated center section extending substantially over the top of the wheels and downwardly sloped end sections attached to each end of the center section
   a connector extending from substantially the center of the wheel cover into engagement with the frame of the vehicle and providing a rigid support of the wheel cover from the frame at one location on the wheel cover
   a bracket extending outwardly from the frame adjacent each end section and,
   a pivot bolt connecting each end section to a bracket whereby the end sections are supported from the frame but may rotate relative to the bracket and the frame.

* * * * *